ially, it has been discovered that certain para-substituted 2,4-diamino-5-phenoxy-pyrimidines have effective anti-plasmodial action against *Plasmodium gallinaceum* and *Plasmodium berghei*. This group of derivatives, when tested by oral administration in chicks infected with *Plasmodium gallinaceum*, and in mice infected with *Plasmodium berghei*, were found to rapidly clear the blood of the parasites. Moreover, these derivatives appear to act on the exoerythrocyte forms of the parasites, so that recurrences of the disease are infrequent. An added characteristic of the new group of derivatives is that they are relatively nontoxic and substantially free of side effects. This application is a continuation in part of application Serial No. 74,462, filed February 3, 1949, now abandoned, related to 2,4-diamino-5-aryloxypyrimidines, and a continuation in part of application Serial No. 185,684, filed September 19, 1950, now forfeited.

UNITED STATES PATENT OFFICE 2,658,066

2,4-DIAMINO-5-PHENOXYPYRIMIDINES

George H. Hitchings, Tuckahoe, Peter Byrom Russell, Crestwood, and Elvira A. Falco, New Rochelle, N. Y., assignors to Burroughs Wellcome & Co. (U. S. A.) Inc., Tuckahoe, N. Y., a corporation of New York No Drawing. Application November 15, 1951, Serial No. 256,618

6 Claims. (Cl. 260—256.4)

The present invention relates to compositions having new and unexpected properties in the treatment of malarial infections. More particularly, it has been discovered that certain para-substituted 2,4-diamino-5-phenoxy-pyrimidines have effective anti-plasmodial action against *Plasmodium gallinaceum* and *Plasmodium berghei*. This group of derivatives, when tested by oral administration in chicks infected with *Plasmodium gallinaceum*, and in mice infected with *Plasmodium berghei*, were found to rapidly clear the blood of the parasites. Moreover, these derivatives appear to act on the exoerythrocyte forms of the parasites, so that recurrences of the disease are infrequent. An added characteristic of the new group of derivatives is that they are relatively nontoxic and substantially free of side effects. This application is a continuation in part of application Serial No. 74,462, filed February 3, 1949, now abandoned, related to 2,4-diamino-5-aryloxypyrimidines, and a continuation in part of application Serial No. 185,684, filed September 19, 1950, now forfeited.

The antimalarial activity in the series of 2,4-diamino-5-phenoxypyrimidines is found to be considerably enhanced by substitution of the phenolic group in the para position by certain groupings. Thus 2,4-diamino-5-phenoxypyrimidine is only feebly active as an antimalarial and the p-methylphenoxy derivative is almost inactive, whereas the 5-p chlorophenoxy derivative is approximately as active as quinine and the p-phenylphenoxypyrimidine is approximately 3 times as active as quinine. In some instances further substitution in the 6-position of the pyrimidine with an alkyl group markedly enhances the activity against the malarial parasites. Thus 2,4-diamino-5-p-chlorophenoxy-6-methylpyrimidine is about 4.5 times as active as quinine against either *P. gallinaceum* or *P. berghei*, being in this respect nearly 5 times as active as the corresponding compound with hydrogen in the 6-position.

The compositions of the present invention may be represented as substituted 2,4-diamino-5-p-substituted phenoxypyrimidines of the following formula:

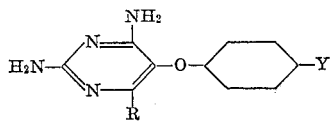

where R is selected from the group consisting of hydrogen and methyl and Y is selected from the group consisting of the chloro, bromo, nitro, phenyl, benzyl and hydrindenyl radicals.

These substances may be produced by the condensation of a formyl phenoxyacetic ester or an α-phenoxy-β-ketoester with guanidine to give a 2-amino-4-hydroxypyrimidine, which is converted to the diaminopyrimidine by chlorination and amination, or by thiation and amination.

The following examples may serve to illustrate the methods used in the preparation of the compounds of the present invention, but are not intended in any way to limit the invention, the scope of which is defined in the claims.

EXAMPLE 1

2,4-diamino-5-p-chlorophenoxypyrimidine

A mixture of 95 g. (0.46 mole) of ethyl-p-chlorophenoxy acetate and 37 g. (0.50 mole) of ethylformate is added slowly to 500 milliliters of dry diethyl ether containing 10.6 g. (0.46 mole) of sodium wire and the resulting mixture allowed to stand overnight at about room temperature. An alcoholic solution of guanidine (prepared by mixing 35 g. of guanidine hydrochloride and an alcoholic solution of sodium ethylate) is added to the solution and the ether removed by evaporation. The reaction mixture is then heated under a reflux condenser for four hours and the 2-amino-4-hydroxy-5-p-chlorophenoxypyrimidine precipitated by adding 3 liters of cold water and then acidifying to a pH of about 6.5. The product is purified by recrystallization from glacial acetic acid. A portion of the product (15 g.) is dissolved in 50 milliliters of phosphoryl chloride and refluxed for about half an hour. The excess phosphoryl chloride is distilled from the product and the reaction mixture chilled in the presence of cracked ice and neutralized to precipitate the 2-amino-4-chloro-5-p-chlorophenoxypyrimidine which is washed with water and dried under vacuum.

The amination of the product is performed by treating 3 g. of the 2-amino-4-chloro-5-p-chlorophenoxypyrimidine with 100 milliliters of a saturated ethanolic ammonia solution in a sealed vessel at a temperature of about 150° C. for a period of sixteen hours. The product is evaporated to dryness on a steam bath and taken up in 50 milliliters of water whereupon the desired diamino derivative is precipitated by the addition of excess saturated sodium hydroxide solution. Purification is performed in aqueous medium by the addition of hydrochloric acid followed by precipitation with sodium hydroxide solution, the pure compound recovered having a M. P. of 173–175° C.

EXAMPLE 2

*2,4-diamino-5-p-chlorophenoxy-6-methylpyrimidine*

To a solution of ethyl-alpha-chloroacetoacetate in alcohol is added an equimolar quantity of sodium p-chlorophenolate and the mixture was heated under a reflux condenser for 2 days. The mixture was poured into water and the ethyl-p-chlorophenoxyacetoacetate was recovered by extraction with benzene and ether, and after drying was purified by distillation. The resulting ester was condensed with an equimolecular quantity of guanidine carbonate in alcoholic solution on the steam bath and the 2-amino-4-hydroxypyrimidine was recovered from dilute aqueous acetic acid. The 2-amino-4-chloro derivative was prepared and aminated as in the previously given examples. The final product melted at 205–207° C.

EXAMPLE 3

*2,4-diamino-5-p-bromophenoxypyrimidine*

Ethyl p-bromophenoxyacetate was prepared from p-bromophenol and ethylbromoacetate with sodium ethylate in ethanolic solution, formylated and condensed with guanidine to give 2-amino-4-hydroxy-5-p-bromophenoxypyrimidine (M. P. 248–254°). The crude aminohydroxypyrimidine was chlorinated with phosphoryl chloride and the product aminated in the usual way. The product after two recrystallizations from ethanol formed as white needles, M. P. 202–204°.

EXAMPLE 4

*2,4-diamino-5-(p-benzylphenoxy)-pyrimidine* p-Benzylphenoxyacetic acid was obtained by the reaction of p-benzylphenol and ethyl bromoacetate and sodium hydroxide in aqueous alcoholic solution (1:6). Esterification gave ethyl p-benzylphenoxyacetate, B. P. 213–221 (20 mm.). The above ester was formylated using sodium wire in dry ether and the formyl esther was condensed with an alcoholic guanidine solution (from the hydrochloride). Chlorination and amination of the resultant aminohydroxypyrimidine gave 2,4 - diamino-5-(p-benzylphenoxy)-pyrimidine, M. P. 186–187°.

EXAMPLE 5

*2,4-diamino-5-(p-phenylphenoxy)-pyrimidine*

Ethyl p-phenylphenoxyacetate was prepared by the reaction of p-hydroxydiphenyl, sodium ethylate and ethyl bromoacetate in ethanolic solution, M. P. 56–8°. By formylation, condensation with guanidine, and chlorination and amination of the resultant aminohydroxypyrimidine, by the methods of Example 1 above, there was obtained 2,4-diamino-5-p-(phenylphenoxy)-pyrimidine, M. P. 246–249°.

An alternative method for the preparation of phenoxyacetates may be illustrated as follows: Ethyl α-chloroacetoacetate, p-phenylphenol and sodium ethylate in equimolecular proportions in ethanolic solution were heated under reflux for two hours. Addition of water and extraction with ether gave an ester solution from which ethyl p-phenylphenoxyacetate, identical with the above prepared substance, was isolated by distillation in vacuo in 70 percent yield.

EXAMPLE 6

*2,4-diamino-5-(p-phenylphenoxy)-6-methylpyrimidine*

Ethyl α-p-phenylphenoxyacetoacetate was prepared in the following manner: p-Phenylphenol (85 g.) was dissolved in toluene 1 l. and 11.5 g. of sodium added. The whole was warmed gently until the reaction of the sodium was complete (2 hours). After cooling, 82 g. of α-chloroacetoacetic ester were added, the mixture refluxed for 8 hours. The toluene solution was extracted with water, and the toluene (and traces of water) then removed by distillation. To the residue was added guanidine carbonate (45 g.) and ethanol (200 ml.) and the whole heated under reflux for 6 hours. The resultant solution was diluted with water and neutralized with acetic acid, giving 100 g. of 2-amino-4-hydroxy-5-(p-phenylphenoxy)-6-methylpyrimidine.

From 15 g. of the aminohydroxypyrimidine there was obtained, by the usual procedures, 4 g. of 2,4-diamino-5-(p-phenylphenoxy)-6-methylpyrimidine as long needles melting at 328° with decomposition.

EXAMPLE 7

*2,4-diamino-5-(p-hydrindenylphenoxy)-pyrimidine*

Ethyl hydrindenylphenoxyacetate (B. P. 255–60° at 17 mm.) was prepared from hydrindenylphenol and ethyl bromoacetate in the presence of sodium ethoxide. This was formylated with sodium and ethyl formate and treated with an equimolar quantity of alcoholic guanidine solution (from guanidine hydrochloride and sodium ethoxide). The mixture was refluxed for 10 hours, diluted with water and acidified. The aminohydroxypyrimidine, recrystallized from aqueous acetic acid, melted at 297–310°.

The aminohydroxy compound (20 g.) was refluxed with phosphorus oxychloride (100 ml.) and the resultant chloro compound was aminated in the usual manner. The 2,4-diamino-5-(p-hydrindenylphenoxy)-pyrimidine was purified by solution in 70% acetic acid followed by precipitation by the addition of water, M. P. 203–8°.

EXAMPLE 8

*2,4-diamino-5-p-nitrophenoxy-6-methylpyrimidine*

From ethyl α-chloroacetoacetate and the sodium derivative of p-nitrophenol in toluene the ethyl p-nitrophenoxyacetoacetate was obtained in the usual way, condensed with guanidine carbonate and the resultant aminohydroxypyrimidine was converted to 2,4-diamino-5-p-nitrophenoxy-6-methylpyrimidine by chlorination and amination. The melting point was 239–239.5°.

The same compound was prepared by the nitration of 2,4-diamino-5-phenoxy-6-methylpyrimidine.

Since the base is the physiologically active moiety in any non-toxic salt of any compound described herein, the known non-toxic salts of these derivatives are regarded as the equivalent of the uncombined bases described in the specification and claims herein.

We claim:
1. As a new compound, a 2,4-diamino-5-phenoxypyrimidine of the formula:

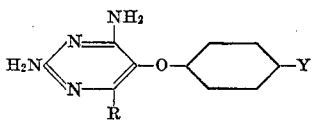

where R is selected from the group consisting of hydrogen and methyl and Y is selected from the group consisting of chloro, bromo, nitro, phenyl, hydrindenyl, and benzyl radicals.

2. 2,4 - diamino-5-p-chlorophenoxy-6-methylpyrimidine.
3. 2,4-diamino-5-p-phenylphenoxypyrimidine.
4. 2,4 - diamino - 5-p-nitrophenoxy-6-methylpyrimidine.
5. 2,4-diamino-5-p-bromophenoxypyrimidine.
6. 2,4 - diamino-5-(p-phenylphenoxy)-6-methylpyrimidine.

GEORGE H. HITCHINGS.
PETER BYROM RUSSELL.
ELVIRA A. FALCO.

No references cited.